April 8, 1930.  G. W. GRISMORE  1,753,410
FLANGE OILING AND SAFETY DEVICE
Filed Sept. 26, 1928
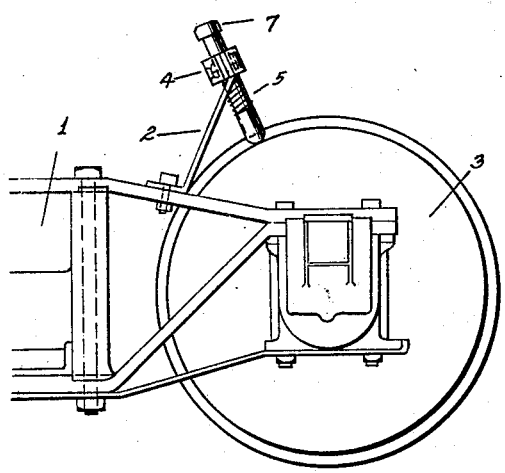
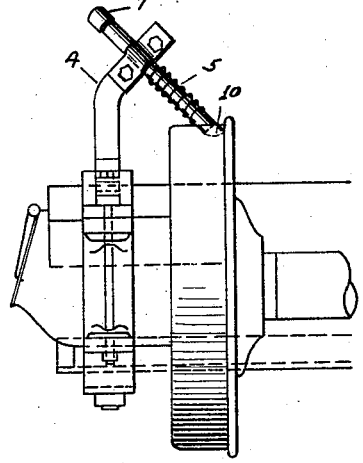
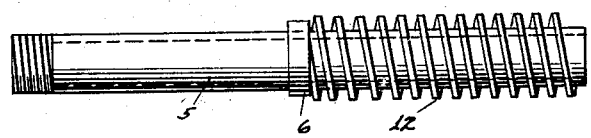
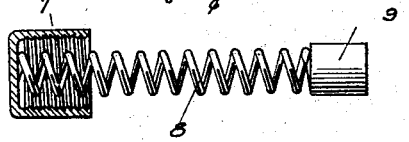
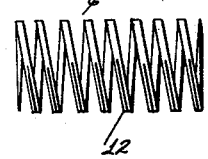
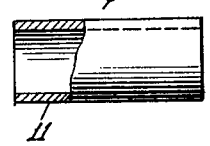
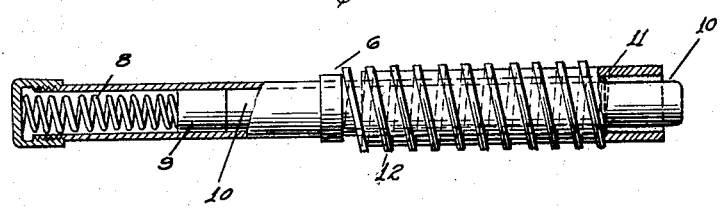
George W. Grismore
INVENTOR
BY Victor J. Evans
ATTORNEY Patented Apr. 8, 1930

1,753,410

UNITED STATES PATENT OFFICE

GEORGE W. GRISMORE, OF SALT LAKE CITY, UTAH

FLANGE OILING AND SAFETY DEVICE

Application filed September 26, 1928. Serial No. 308,469.

My present invention has reference to means for lubricating the flanges of car and locomotive wheels of all kinds provided with flanges.

The primary object of my invention is the provision of a means for this purpose whereby a stick or bar of lubricating material will be held in contact with the face and edge of a wheel flange to effectively lubricate the same and reduce wear upon the flange and heads of the rails in turning curves, etc., and likewise to reduce the objectionable noises resulting from the grinding contact of such surfaces.

A further object is the provision of a wheel flange lubricator that shall be of an extremely simple construction and which may be readily attached to the wheel truck frame of a car or other frame of a locomotive and wherein the same will constantly deliver a lubricant to the flange of the wheel and avoid directing such lubricant to the tread of the wheel which would result in the slippage of the wheel and further wherein the device is retained at a desired angle with respect to the wheel and the metal parts thereof held out of contact with the wheel.

A further object is the provision of a device of this character in which the lubricant stick is gently fed to the flange of the wheel so that the same will be long lived and likewise wherein the charge of lubricant may be easily and quickly replenished when occasion requires.

To the attainment of the foregoing the invention resides in the improvement hereinafter described and definitely claimed.

In the drawings:

Figure 1 is a side elevation of a sufficient portion of a wheel truck frame to illustrate the application of my improvement thereon.

Figure 2 is a view looking at right angles to Figure 1.

Figure 3 is a plan view of the metal tube that comprises the body of the improvement.

Figure 4 is a plan view with parts in section to illustrate the manner in which the plunger for the lubricant stick is connected with the spring and the spring in turn is connected with the cap for the tube.

Figure 5 is a side elevation of the outer spring.

Figure 6 is an elevation of the compressible tube or hose, parts being broken away and parts in section.

Figure 7 is a side elevation of the improvement with parts broken away and parts in section.

In the showing of the drawings I have mounted on the upper bar of the frame of a wheel truck 1, an upwardly directed angularly disposed rod 2 which has its upper end extended at an angle with respect to the wheel 3 that is journaled on the frame. The upper end of the bar 2 is also provided with a socket portion to cooperate with the removable socket which is bolted to the angle end 4 of the said bar. These sockets are designed to clamp therebetween the metal tubular body 5 of the improvement. The tube 5 is approximately centrally formed with an annular enlargement or collar 6. The collar may, of course, be welded or otherwise secured rigidly to the tube, and the upper and outer end of the tube is exteriorly threaded.

The threaded end of the tube is designed to be closed by a screw cap 7. This cap has welded or otherwise fixedly secured therein one end of an outwardly directed coil spring 8, the second end of the spring being welded or otherwise fixedly secured to a plunger 9. The plunger is designed to engage with a stick of hard lubricant 10, to force the same outward through the tube.

The outer end of the tube and the end of the lubricant stick have arranged therearound a compressible pipe which may be in the nature of a short section of garden hose which is indicated by the numeral 11. Fixed on what may be termed the outer face of the collar 6, either by welding the same to the collar or by other means, there is a helical spring 12. The convolutions of this spring serve as threads whereby the compressible pipe 11 may be screwed on the tube, so that its outer end is retained at desired positions with respect to the outer end of the tube 5. It is to be noted that the compressible pipe 11 projects a considerable distance beyond the outer end of the tube, and the compressible pipe prevents any metal part of the device contacting with the car wheel 3.

By reference to Figures 1 and 2 of the drawings it will be seen that the improvement is held at an angle with respect to the wheel so that the outer and projecting end of the hard lubricant stick 10 contacts only with the flange of the wheel and, therefore, the tread surface of the wheel is not lubricated. This is important as lubricant applied to the tread surfaces of the wheels would cause slippage of the wheels. The improvement is of an extremely simple construction and can be quickly and easily applied to any ordinary construction of cars or locomotives. The hard lubricant stick does not readily wear, but applies a constant and sufficient lubricant to the flange of the wheel. The stick, when worn may be readily replaced by another hard lubricant stick by simply unscrewing the cap 7 and bodily removing the pressure spring 8 and the plunger 9 from the tube. The flexible pipe 11 is employed in order that the lubricating stick may be effectively held in the improvement and yet permitted a desired yielding movement and likewise as a wiper should excessive movement be imparted to the wheel.

While I have herein set forth a satisfactory embodiment of my improvement as it now appears to me, obviously I do not wish to be restricted to the precise details herein set forth and, therefore, it is to be understood that I hold myself entitled to make such changes therefrom as fairly fall within the scope of what I claim.

Having described the invention, I claim:

1. In a lubricator for wheel flanges, a tube supported above and at an angle with respect to the car wheel and directed toward the flange thereof, a spring influenced lubricant stick carried by the tube, movable therethrough and designed to contact with the flange of the wheel, a helical spring fixed on the tube, and a short compressible pipe screwed in the convolutions of the spring and disposed over the tube and projecting beyond the outer end thereof, and partly covering the projecting end of the lubricant stick.

2. In a lubricator for wheel flanges, a tube supported at an angle and directed toward the flange of a car wheel, said tube designed to receive a hard lubricant stick therein which projects through one end thereof, a plunger in the tube, a spring having one end welded to the plunger, a screw cap for closing the upper or outer end of the tube to which the second end of the sping is welded, said plunger designed to project the lubricant stick through the tube against the flange of the wheel, a fixed collar on the tube, a helical spring surrounding the outer end of the tube and welded to the collar and a short compressible pipe section screwed on the tube between the convolutions of the last mentioned spring, projecting beyond the said end of the tube and partly enclosing the projecting end of the lubricant stick.

In testimony whereof I affix my signature.

GEORGE W. GRISMORE.